W. L. JUKES.
Lamp Chimney.

No. 38,492.

Patented May 12, 1863.

Witnesses:

Inventor:

UNITED STATES PATENT OFFICE.

WESLEY L. JUKES, OF COVINGTON, KENTUCKY.

IMPROVEMENT IN LAMP-CHIMNEYS.

Specification forming part of Letters Patent No. 38,492, dated May 12, 1863.

*To all whom it may concern:*

Be it known that I, WESLEY L. JUKES, of Covington, Kenton county, Kentucky, have invented a new Manufacture of Glass Chimney for Coal Oil and other Lamps, of which the following is a specification.

Figure 1:
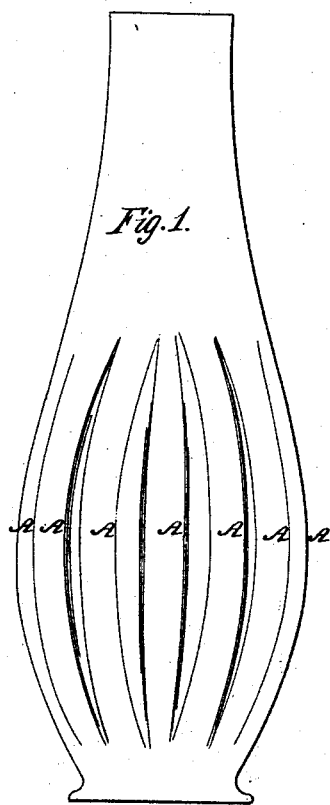
Figure 2:
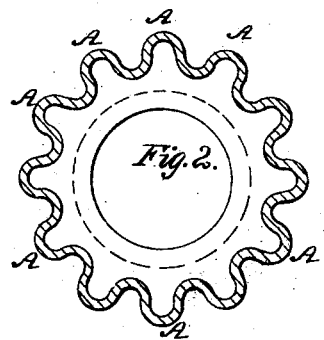

In the annexed drawings, making part of this specification, Figure 1 is a side elevation of my chimney. Fig. 2 is a transverse section through the bulb.

The invention consists in forming a lamp-chimney with a number of longitudinal corrugations, A, which may either extend the full length of the chimney or may be confined to the bulb merely, as in the illustration. These chimneys may be blown in a mold, but I prefer to blow the chimney in the ordinary way, but with a larger bulb than common, and then, while red hot, to draw it through a wooden triplet, composed of yielding sections of counterpart shape to the corrugations of the chimney. This method leaves unimpaired the bright glaze natural to blown work.

Among the advantages of this form of lamp-chimney may be cited the following: A dispersion of the direct rays of the flame, unaccompanied by the partial absorption, which takes place, more or less, with ground glass, the optical effect being a mild radiance of the size of the bulb in consequence of the light being refracted [and reflected about among the corrugations. The light of a flat flame is more nearly uniform in every direction. The innumerable scintillations give a sparking, lustrous, chandelier-like effect, very pleasing to the eye. The chimney is more strong and durable, partly owing to the stiffening effect of the corrugations and partly due to their interruption of the natural lines of cleavage of the glass. The corrugated chimney is also better able to stand sudden inequalities of heat, possessing, as it does, an elastic quality that is entirely absent from the circular form.

I claim as a new article of manufacture—

The glass lamp-chimney, formed with longitudinal corrugations A, substantially as and for the purpose set forth.

In testimony of which invention I hereunto set my hand.

WESLEY L. JUKES.

Witnesses:
GEO. H. KNIGHT,
A. C. REID.